United States Patent [19]

Marsh

[11] 4,160,722

[45] Jul. 10, 1979

[54] RECOVERY OF PLASTIC FROM MUNICIPAL WASTE

[75] Inventor: Paul G. Marsh, Hamilton, Ohio

[73] Assignee: Black Clawson Fibreclaim, Inc., New York, N.Y.

[21] Appl. No.: 810,095

[22] Filed: Jun. 27, 1977

Related U.S. Application Data

[63] Continuation-in-part of Ser. No. 675,133, Apr. 8, 1976, abandoned, which is a continuation-in-part of Ser. No. 490,568, Jul. 22, 1974, abandoned.

[51] Int. Cl.$^2$ ............................ B03B 1/00; B07B 4/02
[52] U.S. Cl. ........................................ 209/4; 209/138; 209/36; 162/4; 241/20
[58] Field of Search ...................... 162/4, 55; 209/2–4, 209/36, 37, 138, 11, 139 R; 241/19, 21, 24, 28, DIG. 38

[56] References Cited

U.S. PATENT DOCUMENTS

| 2,828,860 | 4/1958 | Morris | 209/4 |
| 3,506,414 | 4/1970 | Skendrovic | 44/1 R |
| 3,524,594 | 8/1970 | Anderson et al. | 241/24 X |
| 3,608,717 | 9/1971 | Strubel et al. | 209/173 X |
| 3,720,380 | 3/1973 | Marsh | 241/21 X |
| 3,741,863 | 6/1973 | Brooks | 162/4 |
| 3,790,091 | 2/1974 | Law et al. | 241/24 |
| 3,802,558 | 4/1974 | Rhys | 209/75 |
| 3,802,631 | 4/1974 | Boyd | 241/24 X |
| 3,848,813 | 11/1974 | Stanczyk et al. | 241/24 X |

OTHER PUBLICATIONS

Boettcher; R. A., "Air Classification for Reclamation Processing of Solid Wastes," ASME Paper 69-WA/-PID-9, 1969.

*Primary Examiner*—Ralph J. Hill
*Attorney, Agent, or Firm*—Biebel, French & Nauman

[57] ABSTRACT

The plastic discarded in municipal solid waste is recovered by a process wherein the waste is reduced to a particulate mass having a liquid content of 20% or more such that the paper and other absorbent constituents retain sufficient liquid to be substantially heavier than the sheet plastic pieces of comparable size. The mass is then subjected to an air separation treatment wherein the plastic pieces are blown free of the paper and other constituents of the mass. In one form, the solid waste is first pulped in water to slurry form, some of the fiber is recovered from the slurry by screening, and the reject flow from the screen is dewatered and subjected to the air separation treatment. In another form, the solid waste is dry shredded and the high specific gravity materials removed prior to pulping. In still another form, the dry material is wetted sufficiently for effective air separation of the plastic.

11 Claims, 7 Drawing Figures

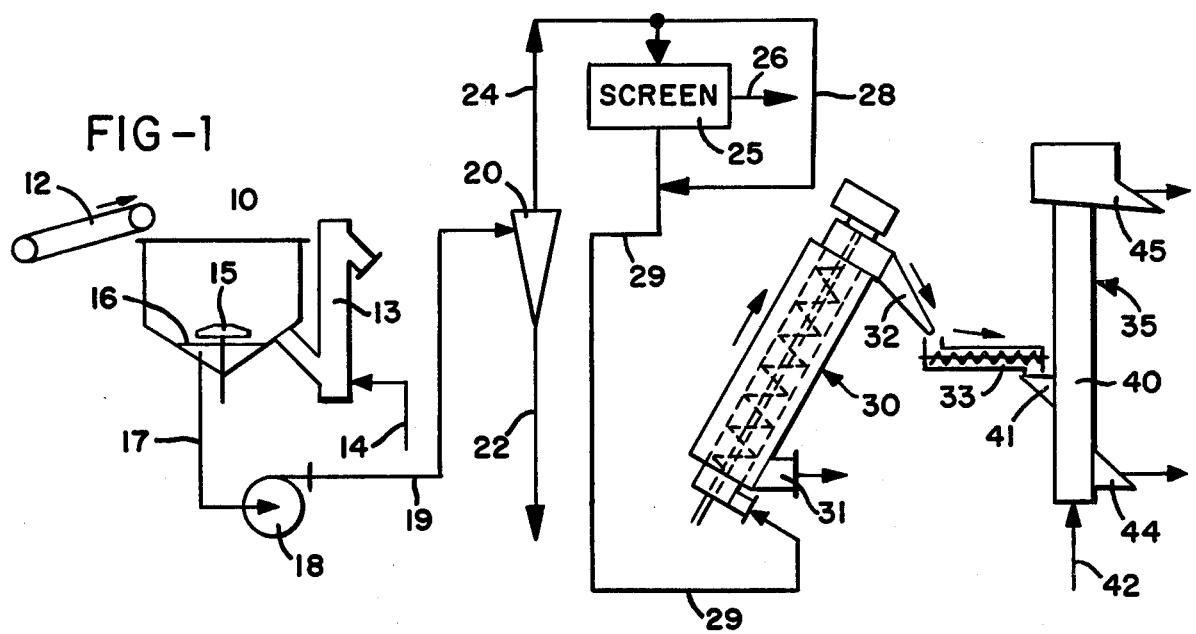

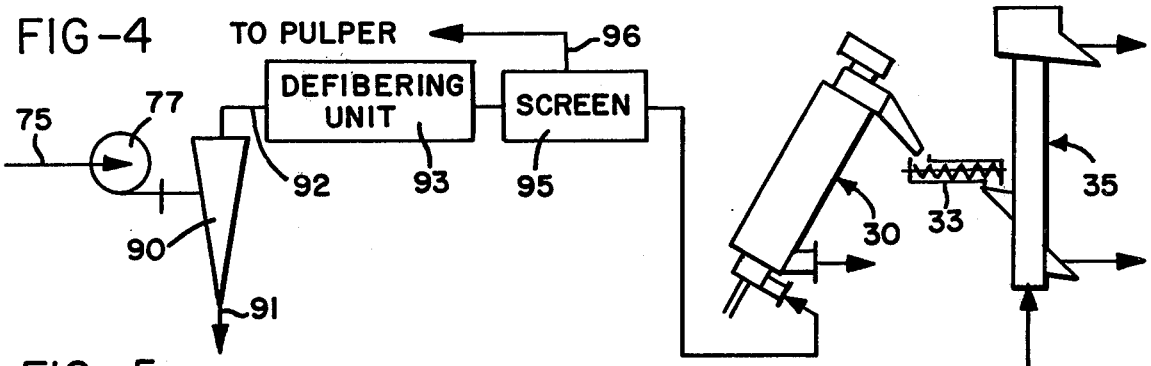
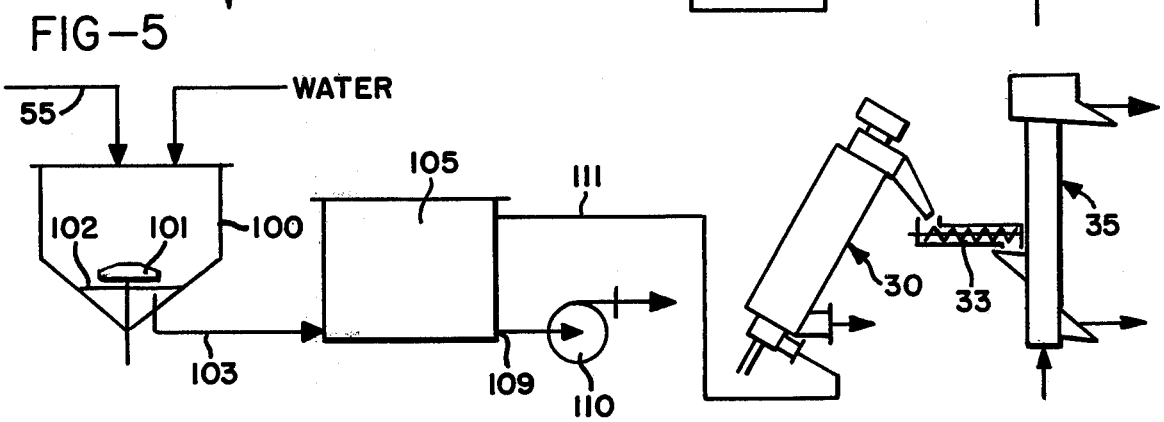
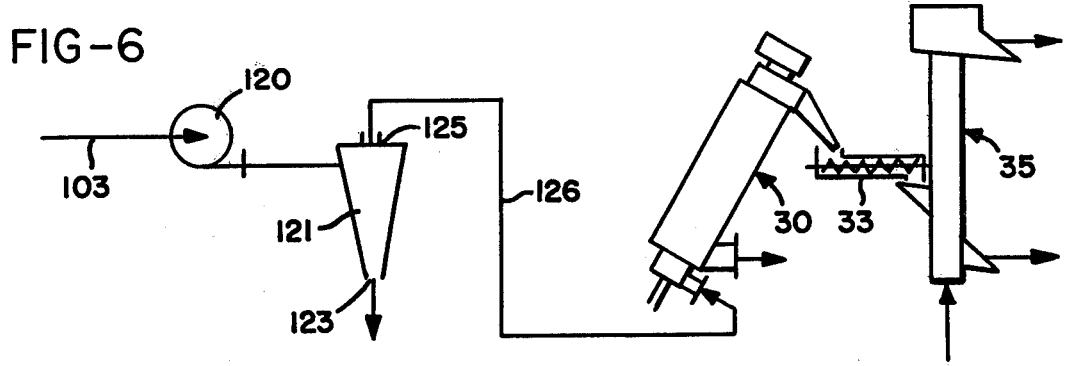

RECOVERY OF PLASTIC FROM MUNICIPAL WASTE

CROSS REFERENCE TO COPENDING APPLICATION

This application is a continuation-in-part of my application Ser. No. 675,133, now abandoned, which was filed Apr. 8, 1976 as a continuation-in-part of my application Ser. No. 490,568, filed July 22, 1974 and now abandoned.

BACKGROUND OF THE INVENTION

Solid waste materials of the type typified by municipal waste have traditionally presented problems of disposal, and these problems have become increasingly critical in recent years as a result of not only a rapidly increasing population, but also the compounding difficulty of the drastic increase in per capita production of solid waste. In addition, there has been a recent notable change in the character, or composition, of municipal waste, due primarily to the supplanting of metal, wood and glass as packaging materials by paper and plastic. For example, a recent industry-sponsored survey reported that collected waste in the United States in 1970 included six billion pounds of plastic, of which approximately 37% was film.

Conventionally, solid waste has been disposed of primarily by incineration and land fill, and the replacement of inorganic packaging materials by paper and plastic has resulted in the favoring of incineration over land fill. Over the last several years, however, the public has become increasingly aware of solid waste as a source of atmospheric pollution as well as the prime example of dissipation of natural resources. This has led to a growing demand by both government and the public that wherever possible, recycling should be employed to accomplish the dual results of reduction of the pollution problem and conservation of natural resources.

There is presently a growing interest in the area of generic segregating, blending, and the use of waste plastic. Yet in spite of the increasing serious shortages in virgin material for the production of plastic, there has been insignificant activity in the development of techniques for separating plastics from the other contaminants present in solid waste. Salvage from municipal solid waste has thus far been practiced only in isolated cases, with the great majority of the plastic discarded in municipal solid waste being incinerated or buried.

As further background of the invention, a report by the U.S. Department of H.E.W. as recently as 1968 gave the typical composition of municipal refuse as comprising 5% plastics on a bone dry basis, which translated into 6.6% of the total organic constituents, the great majority of this plastic consisting of polyethylene, polyvinyl chloride and polystyrene. This has been substantially confirmed by the experience of the assignee of this application, during the course of operating a new municipal waste recycling plant in Franklin, Ohio since mid-1971. The present invention grew out of the belief that this large percentage of plastic justified the development of a successful method of separating it from the other organic constituents of municipal waste.

SUMMARY OF THE INVENTION

The municipal waste disposal plant referred to in the preceding paragraph embodies inventions of a number of patents of the present applicant and other assignors to the same assignee, including Baxter U.S. Pat. No. 3,549,092, Blakley et al. U.S. Pat. No. 3,595,488, Marsh U.S. Pat. No. 3,720,380, Marsh U.S. Pat. No. 3,736,223 and Marsh U.S. Pat. No. Re. 29,156. Each of these three Marsh cases emphasizes the recovery of one or another reusable by-product from municipal waste, namely glass and aluminum in U.S. Pat. No. 3,720,380, paper fiber in U.S. Pat. No. 3,736,223 and fuel in U.S. Pat. No. Re. 29,156, which fuel contains some or all of the paper fiber along with the plastic and other organic constituents of municipal waste.

It is the primary object of the present invention to provide a process by which plastic constituents of municipal waste can readily be separated from the other constituents in a form which facilitates their reuse. This objective may be accomplished by modification of the processes disclosed in the above patents as now briefly described.

In the operation of the waste handling plant constructed in accordance with the above patents, municipal refuse is first treated in aqueous suspension in suitable pulping apparatus to reduce as many as possible of its readily frangible constituents, both organic and inorganic, to a pumpable slurry of mixed particles in the aqueous medium, and with all of the particles in the slurry being of less than a predetermined maximum size which is established by the size of perforations in a screen plate through which the slurry is extracted from the pulping apparatus, typically ⅛ to 2 inches in diameter. This slurry is then subjected to a cleaning operation capable of removing the great majority of the insoluble inorganic materials, namely the metals, glass and ceramics, stones, and any other dirt, satisfactory results for this purpose being obtained in one or more liquid cyclones of suitable capacity.

Upon completion of these steps, the solids in the resulting slurry will be particles of which the majority will be plastic and paper, the latter being present as a mixture of separated paper fibers and pieces of undefibered paper and paper board. Much of the plastic will be in the form of pieces of sheet material comparable in size to postage stamps, but with some variety of larger pieces, and it will range in thickness depending upon whether its original form was in a sheet or in a bottle or other container or piece of heavier caliper.

Practice of the invention from this point will depend upon whether or not paper fiber is also to be reclaimed from the slurry. It so, the slurry is first subjected to a screening operation as described, for example, in Marsh U.S. Pat. No. 3,736,223, in which case the plastic will be among the reject material from whatever screen is used. The slurry of reject material, or the entire cleaned slurry if no fiber is to be recovered, is then dewatered to a sufficient extent to produce a particulate mass of soggy but readily crumbly nature.

Depending upon the nature and operation of whatever dewatering apparatus is used, sufficient liquid should be removed to produce an average solids content of preferably at least 20 to 25% but generally no more than about 50%, depending upon the fiber content of the mass, in order to impart the desired soggy but crumbly characteristics to the fiber and other material which tends to absorb water. If no fiber is removed before dewatering, approximately 50% solids is a practical maximum obtainable with conventional dewatering apparatus, and this will provide the fiber with the desired soggy characteristics. In any case, the extent of dewatering is not critical and can vary over a substantial range so long as the net result is to reduce the mass as a whole to a condition wherein it will readily break apart for separation of the relatively dry plastic from the relatively soggy fibrous constituents.

If good fiber is separated out before dewatering, this will have the dual effect of removing the water absorbed therein and also reducing the amount of material in the mass which tends to retain water. This residue can be dewatered to a higher solids content in dewatering apparatus, such as a press, which as a practical matter cannot dewater a predominantly fibrous mass to more than 50% solids. This value, however, will increase as the ratio of plastic to fiber increases, and may reach as high a value as 80% for a mass in which plastic is a major constituent, because of the relatively large amount of essentially free water in a predominantly plastic mass, as well as the correspondingly small amount of water-absorbing fiber.

The purpose of the dewatering operation, and of its controlled results, is to make it possible to retain enough water absorbed in the paper fiber and the undefibered pieces of paper to make them substantially heavier than pieces of plastic sheet or film of comparable size. In other words, since these plastic constituents of solid waste have substantially no water absorptivity, removal of the free water from the slurry will leave them essentially dry, at least as compared with the still damp paper constituents.

At this stage of treatment, the partially dried particulate mass should be broken up sufficiently to eliminate lumps and clumps of relatively damp material, as by any suitable fluffing or other agitating operation. For example, the mass discharged from the dewatering apparatus can be tumbled onto a belt conveyor or delivered to a screw conveyor at a controlled rate such that it fills only a fraction of the conveyor housing and is thus tumbled by the screw in the course of its passage therethrough.

If the crumbled mixture is then delivered to a pneumatic separator wherein an air current blows upwardly, this current will perform the function of blowing the relatively dry and light pieces of plastic out of the soggy paper particles with which they are intermingled. This result is accomplished quite readily because of the significant difference in the weight and the response to air currents of the dry pieces of plastic in comparison with the still damp paper and other absorbent constituents of the mass, which can thereafter be converted to fuel or otherwise disposed of. Other air separation treatments can also be used, such as an air cyclone wherein the pieces of plastic act as the lights and exit at the top.

The principles established in the operation of the waste handling plant as outlined above are also applicable to the recovery of plastic film from other sources of mixed solid waste and other waste handling systems, as is described in detail hereinafter. All such applications of the invention are characterized by treatment which results in the reduction of the waste to a particulate mixture of crumbly characteristics wherein the paper and other water-absorbent materials still retain sufficient water to be of substantially higher specific gravity than the plastic film so that the pieces of film can be readily blown free of the balance of the mixture.

BRIEF DESCRIPTION OF THE DRAWINGS

FIG. 1 shows somewhat schematically a complete wet process system for performing the invention;

FIG. 2 is a similar view illustrating a dry process system modified to carry out the invention;

FIG. 3 shows a modification of the system of FIG. 2;

FIG. 4 shows a modification of the system of FIG. 3;

FIG. 5 shows another modification of the system of FIG. 2;

FIG. 6 shows a modification of the system of FIG. 5; and

FIG. 7 shows another modification of the system of FIG. 2.

DESCRIPTION OF THE PREFERRED EMBODIMENTS

The system shown in FIG. 1 includes a waste treatment tub 10 to which solid waste materials may be fed by any suitable means, such as a conveyor 12. A junk remover 13 communicates with tub 10 for removing relatively infrangible materials therefrom, and an aqueous medium, such as water, may be fed into the tub through the junk remover 13 by means of the line 14.

All of the above equipment may be of the type more fully described in Baxter U.S. Pat. No. 3,549,092, with the pulper preferably being of the characteristics shown in Blakley et al. U.S. Pat. No. 3,595,488. As described in detail in those patents, a rotor 15 is provided in tub 10 which establishes a vortical flow pattern and subjects the solid waste material in the tub to violent hydraulic and mechanical shear forces, thereby reducing relatively frangible portions of the solids to the appropriate size for extraction through an extraction plate 16 in the bottom of the tub having relatively large holes, e.g. ½ to 2 inches in diameter, one inch being typical.

A slurry, consisting of a portion of the aqueous medium and approximately 2-6% of relatively frangible solid waste materials reduced to a size sufficiently small to pass through the extraction plate 16, is removed by means of line 17 and pumped by pump 18 through line 19 to a centrifugal cleaner or liquid cyclone 20 of relatively large size and capacity. This slurry is fed tangentially into cleaner 20, and most of the gritty inorganics are removed in conventional fashion through the apex of the cleaner, as indicated by the arrow 22.

The accepted fraction of the slurry, constituting approximately 99% of the total volume and about 75-80% of the total solids fed into the cleaner 20, passes out of the accepts outlet at the top of the cleaner by means of the line 24. If some of the fiber is to be recovered, the line 24 is connected to suitable screening apparatus 25, preferred results having been obtained in the operation of the above noted plant with a pressure screen which is generally of the construction shown in Martindale U.S. Pat. No. 2,835,173 and wherein the screen perforations are sized to accept only substantially completely defibered paper and particles of similar sizes, i.e. perforations in the range of approximately 0.050 to 0.080 inch in diameter. The accepts flow from the screen 25 is shown as conducted by a line 26 to the next station in the fiber reclaiming system, for example as described in Marsh U.S. Pat. No. 3,736,223.

For the purposes of the present invention, primary interest lies in the accepts flow from the screen 25, or the entire accepts flow from the cleaner 20 if no fiber is to be reclaimed therefrom. In either case, the flow is conducted by a line 28 or 29 to suitable dewatering apparatus 30 capable of reducing the slurry fed thereto into a particulate mixture having a solids content of at least 20%, and which will comprise 11% or more of plastic, depending upon whether or not the screen 25 is in the system and removed some of the fiber. The dewatering apparatus 30 is shown as an inclined screw press having a liquid outlet 31 and a solids outlet chute 32, but this is merely representative of suitable dewatering apparatus. Other types may be used, alone or in successive stages.

The test for a satisfactorily soggy but relatively crumbly condition is relatively subjective, and not critical. As a practical matter, the liquid need not be removed beyond the point at which when a handful of the particulate mass is squeezed in the hands of an operator, no liquid will be readily expressed. Again as a practical matter, this condition will usually exist when the ratio of liquid to the fibrous constituents of the mass is at least approximately 50/50 and preferably not more than 80/20. It is to be understood that it is this condition which is defined in the claims as the soggy but readily crumbly characteristics required for the practice of the invention.

The dewatering device 30 should be capable of discharging a particulate mass having a solids content of at least 20%, but as already explained, it will generally not exceed about 50%, unless some fiber is selectively removed at screen 25. As previously noted, dewatering to a solids content in this range, and preferably to about 50% retained moisture in the fibrous constituents, will provide the mass as a whole with adequately soggy but crumbly characteristics for the purposes of the invention, because its primary constituent will be paper fragments of a variety of sizes, including separated fibers, which will be dry enough to have an adequately small tendency to adhere together in lumps, but which will still retain enough absorbed water to have an aggregate particle weight substantially higher than if they were bone dry. In contrast, the plastic constituents of the mass will be primarily pieces of film or sheet, many comparable to large postage stamps in size and shape, which neither absorb nor adsorb water to an appreciable extent and are thus notably lighter than pieces of wet paper of comparable size.

The practice of the invention is promoted by fluffing or otherwise agitating the material discharged by the dewatering device 30 sufficiently to disperse whatever lumps may occur. This result can be accomplished in part by causing the discharge from the dewatering device 30 to tumble down the chute 32, and it is further aided by the use of a screw conveyor 33 to forward the material to the next station 35 at which the plastic pieces are separated from the balance of the mass.

FIG. 1 shows at 35 a conventional pneumatic separator comprising a column 40 having an inlet 41 at an intermediate position, a pressure air inlet at its lower end represented by the arrow 42, a heavy solids outlet 44 near the bottom end, and a light material outlet 45 at the upper end. In operation, as the material delivered to the inlet 41 tumbles down within column 40, the upward air flow will blow the pieces of plastic free of the other constituents and carry them to the light material outlet 45. The wet paper and other solids will be discharged from the outlet 44 for further processing, e.g. conversion to fuel or disposal by incineration.

FIG. 2 illustrates the application of the invention to a dry process solid waste disposal system as contrasted with the wet process described in connection with FIG. 1. The initial station in FIG. 2 is a dry shredder 50 of conventional construction to which the waste material is continuously delivered by a conveyor 51. The output from the dry shredder 50 is transmitted to an air classifier 52, also of conventional construction such, for example, as a battery of the units 35 in FIG. 1. The output of the air classifier 52 comprises heavies, such particularly as metals, glass and other inorganic materials, which are discharged at 53 for further processing, and the lights which are discharged at 55 and comprise approximately 60% paper, 20% plastic sheet or film, and the balance rags, vegetation residue and the like.

The output 55 of lights in FIG. 2 is delivered to a pulper 60, which for preferred results will be of the construction shown in Felton et al. U.S. Pat. No. 3,339,851 and equipped with a rotor 61 and extraction plate 62 having relatively small perforations, e.g. $\frac{1}{8}$ to $\frac{1}{2}$ inch. The stock extracted at 63 from the pulper 60 will therefore include only solid particles capable of passing through such small holes, and the great majority of them will be paper fibers. In the operation of the pulper, the material retained in the tub will be discharged from time to time through a separate outlet 65 provided with a shut-off valve 66. This material will include most of the plastic sheet and film originally delivered to the pulper, in somewhat larger pieces than in the system of FIG. 1, along with other organic material, incompletely defibered paper, and other fibrous material, and if the plastic is in undesirably large pieces, the retained material may be subjected to further pulping before discharge from the tub, or to further comminuting action before dewatering.

In the application of the invention to the system shown in FIG. 2, it is the plastic-rich material discharged through the outlet 65 which corresponds to the material in the line 29 in FIG. 1, and which is then processed for separation of the plastic film from the other constituents thereof. Accordingly, the outlet 65 is shown as connected to a dewatering device 30, shown as of the same type as in FIG. 1, and then to an air classifiner station 35 corresponding to the pneumatic separator 35 in FIG. 1.

In an alternative use of a portion of the system of FIG. 2, the material delivered to the pulper 60 may be plastic coated paper for treatment as described in Felton et al. U.S. Pat. No. 3,339,851, with the defibered paper extracted at 63 and the retained plastic-rich residue discharged at 65 for treatment at stations 30 and 35. For such use, a centrifugal cleaner like the cyclone 20 may be connected to remove inorganics from the plastic-rich material before it is dewatered.

FIG. 3 illustrates an alternative arrangement for receiving and further processing the mixture of light materials in the discharge line 55 of the system in FIG. 2. The pulper 70 corresponds generally in construction and mode of operation to the pulper 60, in that it includes a rotor 71, an extraction plate 72 having relatively small holes which will accept only relatively completely defibered paper and particles of comparable size, and an outlet line 73. In addition, the pulper 70 is provided with a second outlet line 75 provided at its inlet end with an extraction plate 76 having relatively large holes, e.g. 2 inches in diameter, which will accept correspondingly large pieces of plastic film and other contaminant material.

The flow through the line 75 is therefore continuous and is shown as delivered by a pump 77 to a defibering unit 80 which also has a screening action, such as apparatus of the construction shown in Herbert U.S. Pat. No. 3,698,649. The operation of the unit 80 is to defiber and accept a substantial quantity of the reclaimable paper but to reject the plastic and other non-defiberable materials. The accepts line 81 from the deflaker 80 leads back to the pulper 70, while the plastic and other reject material is delivered by the outlet line 82 for treatment in accordance with the invention in a dewatering device 30 and pneumatic separator 35 corresponding in function to the stations 30 and 35 in FIG. 1. A centrifugal cleaner 85 may be connected between the pump 77 and defibering unit 80 if the flow from outlet line 75 contains substantial quantities of inorganics.

FIG. 4 shows an alternative arrangement in connection with the pulper 70 for producing a plastic-rich concentrate of reject materials. The outlet lines 75 is connected by the pump 77 with a centrifugal separator 90 wherein the gritty constituents are separated for discharge through its heavy reject outlet 91. The accepts flow 92 from the cleaner 90 leads to a secondary defibering unit 93 and then a screen 95 such as a vibrating screen of the Jonsson type commonly used in paper stock preparation. The accepts line 96 from the screen 95 leads back to the pulper 70, while the reject line 97 conveys the plastic-rich slurry from the screen to the dewatering device 30 and pneumatic separator 35.

FIG. 5 shows a further alternative arrangement for receiving the mixture of light materials in the discharge line 55 of the system in FIG. 2 and separating that mixture into a plastic-rich fraction and a predominantly fibrous fraction. The pulper 100 includes an extraction plate 102 below the rotor 101 having relatively large holes, e.g. $\frac{1}{2}$-2 inches in diameter, which will accept correspondingly large pieces of plastic and paper. The outlet line 103 leads to a chest 105 of sufficiently large capacity to provide adequate opportunity for the bulk of the plastic film to float to the top while the relatively heavier paper will tend to remain in the bottom.

The chest 105 is provided with an outlet 109 near its bottom through which a pump 110 withdraws the paper-rich flow for delivery to further defibering and screening stations. The plastic which floats to the top in tank 105 is separately removed by a line 111 to dewatering and air separating stations 30 and 35 corresponding to the stations 30 and 35 in FIG. 1. The connection between the line 111 and chest 105 may be of the overflow type, or it may comprise skimmers of the type commonly used in flotation saveals for the removal of floating material.

FIG. 6 shows an alternative arrangement in combination with the pulper outlet line 103 for separating the plastic and paper fractions in the outlet line 103, comprising a pump 120 which delivers this flow to a centrifugal flotation unit 121. This unit consists of a conical or cylindrical-conical vessel similar to a hydrocyclone but provided with a substantially larger apex outlet 123 than is commonly used for centrifugal cleaning purposes, e.g. an apex outlet equal in flow area to the base outlet 125. In the operation of this unit, the discharge flows through the two outlets will be of approximately equal volumes, and the majority of the paper fraction will be concentrated in the heavies flow through the outlet 123 while the majority of the plastic will be in the lights flow through the outlet 125, from which it is taken by line 126 to a dewatering station 30 and air separating station 35 of the characteristics already described.

These several arrangements described in connection with FIGS. 1-6 typify alternative ways of obtaining plastic-rich concentrates of waste material of a sufficiently small particle size range for the practice of the invention. It will also be apparent therefrom that other arrangements and rearrangements of apparatus can be employed to accomplish the same objectives. For example, the arrangements of FIGS. 5 and 6 could be substituted in the system of FIG. 1 by connecting the accepts line 24 of the cyclone 20 in place of the line 103 in either of FIGS. 5 and 6 to provide a wet process line rather than the initially dry process line illustrated in FIG. 2, and a centrifugal cleaner may be connected in the system whenever it is advantageous to remove inorganic contaminants. If, however, the inorganics are not removed prior to the air separating step, the discharge consistency from the dewatering apparatus will be higher than when only organic material is dewatered, e.g. 40% to 60% solids as compared with 20% to 50% in the system of FIG. 1 if no fiber is removed at the screen 25 and 50% to 80% if all the accepts from the cyclone 20 are screened at 25. Further, other types of dewatering apparatus and air separating apparatus can be used so long as they carry out the objectives of the invention as described above.

It will accordingly be seen that practice of the invention does not depend upon the use of any particular equipment, nor is it essential that the starting material be pulped and then concentrated as described above. Thus, FIG. 7 shows a further alternative arrangement wherein the dry light materials in output line 55 in FIG. 2 are mixed with liquid, in a pulverizing mixer 130 such as a hammer mill, to a desired readily crumbly consistency e.g. 20-50% liquid, and then delivered by a conveyor 33 to an air separator 35 wherein the comparatively dry sheet plastic pieces are separated from the balance of the mixture by blowing them free therefrom. The same system can be used with unseparated solid waste if it does not contain too high percentages of high specific gravity materials, in which case the line 55 would correspond to line 51 in FIG. 2.

In all of their variations of the practice of the invention, the further processing of the separated plastic pieces can follow a number of courses, depending upon the primary desire of the operator, the particular plastics predominating in the recovered material, and the commercial demand in the area convenient to the recovery plant, as now further discussed. If the plastic is to be recycled, it may require further initial cleaning, particularly if there should be any accumulation of dust or organic particles thereon. This can be readily done, after the plastic-rich mixture is dried, by a conventional shaking screen such as has commonly been used for preliminary cleaning of rags to be used in the preparation of paper making stock.

If desired, the plastic can be effectively purified by dissolving it in a suitably selective solvent, such as trichloroethylene in the case of polyethylene, and filtering the resulting solution before recovering the plastic therefrom. The recovered plastic can be used for some purposes in mixed form, for example by remelting, pelletizing, and use as a fuel or as a medium of growing household plants, i.e. as a substitute for vermiculite. The properties of the recovered plastic for use as a fuel may also be enhanced by pyrolysis as described in Marsh U.S. Pat. No. 3,714,038, and its properties for this purpose will not be disadvantageously effected if it includes some other organic contaminants.

The material remaining after the plastic has been blown therefrom can also be disposed of in a variety of ways. If fiber is to be recovered therefrom for reuse, in accordance with Marsh U.S. Pat. No. 3,736,223, the subsequent screening and cleaning operations will be easier by reason of the prior removal of the plastic film.

Similarly if this residue is to be converted to such uses as mulch or cattle food, the prior removal of the plastic facilitates its conversion for either such purpose. If any further processing of the residue calls for dilution thereof, the water recovered at the dewatering station 30 can be recycled for that purpose.

While the processes herein described constitute preferred embodiments of the invention, it is to be understood that the invention is not limited to these precise processes, and that changes may be made therein without departing from the scope of the invention.

What is claimed is:

1. The process of recovering sheet plastic material from a mixture thereof with other solid waste materials including water absorbent fibrous material such as waste paper, comprising:
   (a) converting said mixture to a particulate mass of a predetermined maximum particle size wherein the liquid content is at least approximately equal to the fibrous constituents thereof to impart soggy but readily crumbly characteristics to said mass, and
   (b) subjecting said soggy but crumbly particulate mass to an air separation treatment causing the pieces of sheet plastic to be blown free of the remainder thereof.

2. The process as defined in claim 1 wherein said particulate mass is prepared by the steps of:
   (a) shredding said solid waste materials,
   (b) separating high specific gravity constituents from the resulting shredded material, and then
   (c) mixing the remaining low specific gravity materials with liquid.

3. The process as defined in claim 1 wherein said action of converting said mixture to said particulate mass is carried out by the steps of:
   (a) depositing the mixed solid waste materials and an aqueous medium in a treatment vessel,
   (b) reducing the relatively frangible organic and inorganic solids in the resulting suspension to an aqueous slurry of less than about 10% particles of relatively small size by applying pulping forces thereto, and
   (c) concentrating said slurry by removing therefrom a sufficient portion of the liquid to impart said soggy by readily crumbly characteristics to the remaining concentrated mixture.

4. The process as defined in claim 3 comprising the step of screening said slurry through perforations of predetermined small size to remove correspondingly small particles therefrom, and subjecting the retained material from said screening step to said concentrating and separation steps.

5. The process as defined in claim 3 comprising the step of extracting said slurry from said treatment vessel through perforations of predetermined size prior to said concentrating steps.

6. The process as defined in claim 5 wherein the diameter of each of said perforations is in the range of approximately ½ to 2 inches.

7. The process as defined in claim 3 comprising the further step of removing high specific gravity constituents from said slurry prior to said concentrating step.

8. The process as defined in claim 7 comprising the further step of separating from said slurry particles capable of passage through perforations of the order of 0.05 to 0.50 inch in diameter prior to submission of the balance of said slurry to said concentrating step.

9. The process as defined in claim 3 comprising the initial steps of shredding said solid waste materials, separating high specific gravity constituents from the resulting shredded material, and then depositing the remaining low specific gravity materials and an aqueous medium in a treatment vessel.

10. The process as defined in claim 3 comprising the further steps of separating from said slurry particles incapable of passage through perforations not more than 2 inches in diameter, and subjecting said separated particles to further defibering and then to said concentrating and air separation steps.

11. The process as defined in claim 3 comprising extracting from said vessel particles capable of passage through perforations not greater than ½ inch in diameter, separately removing from said vessel the solid material remaining therein, and then submitting said separately removed material to said concentrating step.

* * * * *